US012603542B2

(12) United States Patent
Tanaka

(10) Patent No.: US 12,603,542 B2
(45) Date of Patent: Apr. 14, 2026

(54) ROTATING ELECTRIC MACHINE

(71) Applicant: HONDA MOTOR CO., LTD., Tokyo (JP)

(72) Inventor: Shingo Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 240 days.

(21) Appl. No.: 18/475,420

(22) Filed: Sep. 27, 2023

(65) Prior Publication Data

US 2024/0113590 A1 Apr. 4, 2024

(30) Foreign Application Priority Data

Sep. 30, 2022 (JP) ................................. 2022-157218

(51) Int. Cl.
*H02K 5/22* (2006.01)

(52) U.S. Cl.
CPC ...................................... *H02K 5/22* (2013.01)

(58) Field of Classification Search
CPC .. H02K 5/00; H02K 5/10; H02K 5/12; H02K 5/132; H02K 5/22; H02K 5/225; H02K 3/00; H02K 3/50; H02K 3/52; H02K 3/522; H02K 11/00; H02K 11/33; H02K 11/40
See application file for complete search history.

(56) References Cited

U.S. PATENT DOCUMENTS 5,801,465 A 9/1998 Yamada
9,490,677 B2 11/2016 Jo

2009/0256437 A1 10/2009 Miura et al.
2010/0112870 A1 5/2010 Rudolph
2015/0145359 A1 5/2015 Okada et al.
2016/0090053 A1 3/2016 Kato et al.
2017/0302123 A1 10/2017 Kobayashi et al.
(Continued)

FOREIGN PATENT DOCUMENTS

DE 10 2014 117 229 A1 5/2015
JP H1-93980 U 6/1989
JP 2004215475 A * 7/2004 ............. H02K 5/225
(Continued)

OTHER PUBLICATIONS

European Office Action dated Nov. 29, 2024 issued in corresponding European application No. 23 199 800.6; English text (5 pages).
(Continued)

*Primary Examiner* — Tran N Nguyen
(74) *Attorney, Agent, or Firm* — Rankin, Hill & Clark LLP

(57) ABSTRACT

A rotating electric machine includes a motor case, a lead wire that supplies current to a coil in the motor case, a connection terminal including a first fixing portion at one end and a second fixing portion at the other end, the first fixing portion being fixed to the lead wire and the second fixing portion being fixed to a power supply cable, and a terminal box that accommodates the second fixing portion of the connection terminal. The terminal box is separable from the motor case. The motor case includes an opening from which the first fixing portion is exposed to outside. The connection terminal can be separated from the motor case together with the terminal box when the fixing of the first fixing portion is released.

8 Claims, 8 Drawing Sheets

(56) References Cited

U.S. PATENT DOCUMENTS

2022/0224195 A1    7/2022  Matsuda

FOREIGN PATENT DOCUMENTS

| | | |
|---|---|---|
| JP | 4767319 B2 | 6/2011 |
| JP | 2015-19550 A | 1/2015 |
| JP | 2018-61358 A | 4/2018 |

OTHER PUBLICATIONS

Extended European Search Report dated Mar. 4, 2024 issued in corresponding European application No. 23199800.6 (7 pages).
Japanese Office Action dated Aug. 26, 2025 issued in corresponding Japanese application No. 2022-157218; English machine translation included (6 pages).

* cited by examiner

AXIAL DIRECTION

UP

DOWN

FIG. 3

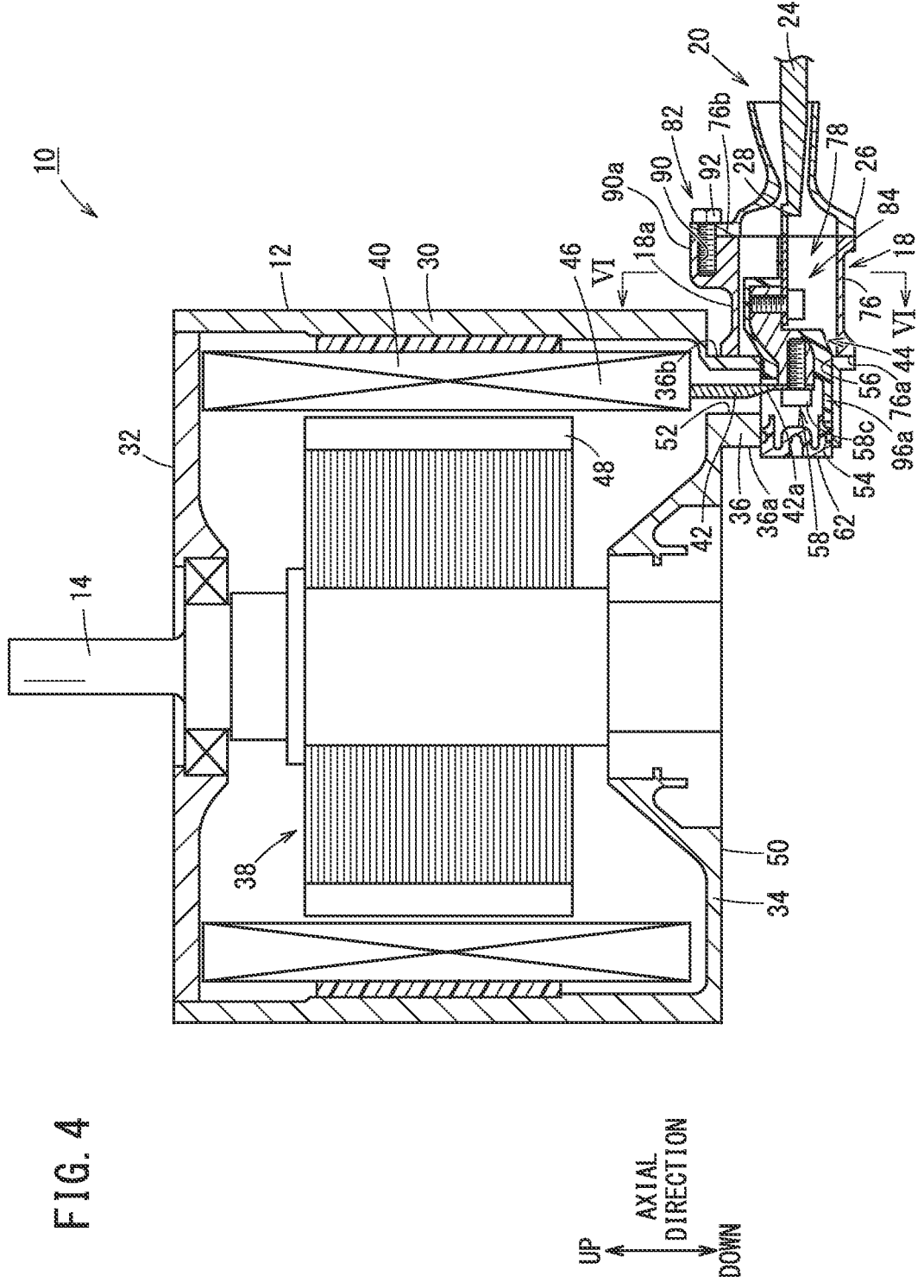
F I G. 4

REARWARD DIRECTION ◄────► FRONTWARD DIRECTION

REARWARD DIRECTION ◄────► FRONTWARD DIRECTION

16

10

10

18    20

20    18

22

UP

AXIAL
DIRECTION

DOWN

ROTATING ELECTRIC MACHINE

CROSS-REFERENCE TO RELATED APPLICATIONS

This application is based upon and claims the benefit of priority from Japanese Patent Application No. 2022-157218 filed on Sep. 30, 2022, the contents of which are incorporated herein by reference.

BACKGROUND OF THE INVENTION

Field of the Invention

The present invention relates to a rotating electric machine provided with a connection terminal for connecting a power supply cable.

Description of the Related Art

A rotating electric machine has a connection terminal for connecting a power supply cable. The connection terminal is a metal fitting for connecting a power supply cable and a lead wire extending from a coil that generates a magnetic field for driving. The connection terminal has a first fixing portion and a second fixing portion in order to ensure stable electrical connection between the lead wire and the power supply cable. The first fixing portion fixes the connection terminal and the lead wire with a bolt or the like. The second fixing portion fixes the connection terminal and the wiring terminal of the power supply cable with a bolt or the like.

For example, as described in JP 4767319 B2, the plurality of connection terminals are covered with an insulating member. Further, the insulating member and the connection terminals are accommodated in the terminal box. The terminal box is fixed to a motor case that accommodates a rotor and a stator of the rotating electric machine

SUMMARY OF THE INVENTION

An apparatus using a rotating electric machine requires maintenance at predetermined time intervals. In particular, rotating electric machines, which bear a large load, require relatively frequent maintenance to remove them from the apparatus. In such maintenance, it is necessary to disconnect the power supply cable from the rotating electric machine. The connection between the power supply cable and the rotating electric machine is released by releasing the first fixing portion or the second fixing portion.

When the second fixing portion is released, since the connection terminals which have not reached the service life is removed. Thus, wasteful replacement of parts is required, and an increase in maintenance cost is caused. Therefore, in maintenance, it is often desirable to release only the first fixing portion and keep the connection terminals connected to the power supply cable.

However, in JP 4767319 B2, a terminal box is formed integrally with the motor case covering the rotating electric machine, and the first fixing portion is disposed inside the case. Therefore, in order to release the fixing of the first fixing portion, it is necessary to open the case of the rotating electric machine, and there is a problem that a large-scale operation is required.

An object of the present invention is to solve the above-described problems.

One aspect of the disclosure is a rotating electric machine including a motor case configured to accommodate a rotor and a stator, a lead wire accommodated in the motor case and configured to supply current to a coil that is configured to generate a magnetic field for driving, a connection terminal including a first fixing portion at one end and a second fixing portion at another end, the first fixing portion being fixed to the lead wire and the second fixing portion being fixed to a power supply cable, and a terminal box configured to accommodate the second fixing portion of the connection terminal, wherein the terminal box is configured to be separated from the motor case, the motor case includes an opening from which the first fixing portion is exposed to outside, and the connection terminal is configured to be separated from the motor case together with the terminal box when fixing between the lead wire and the first fixing portion is released.

In the rotating electric machine according to the above aspect, the fixing between the connection terminal and the lead wire can be released without opening the motor case, and the connection terminal can be separated from the motor case together with the power supply cable. Therefore, the rotating electric machine described above can be easily maintained.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3 is a plan view of the rotating electric machine shown in FIG. 1;

FIG. 4 is a cross-sectional view taken along line IV-IV of FIG. 2;

DETAILED DESCRIPTION OF THE INVENTION

Figure 1:
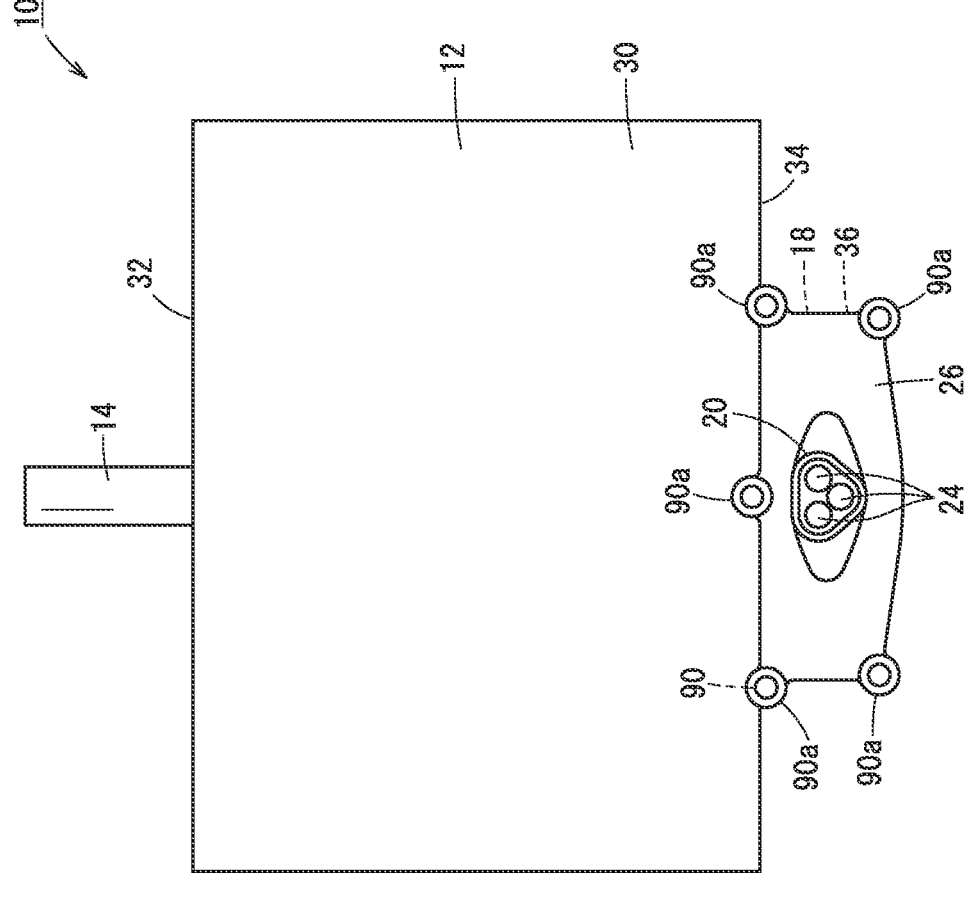
FIG. 1 is a front view of a rotating electric machine according to a first embodiment.
Figure 1:
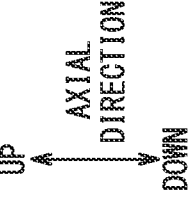
Figure 8:
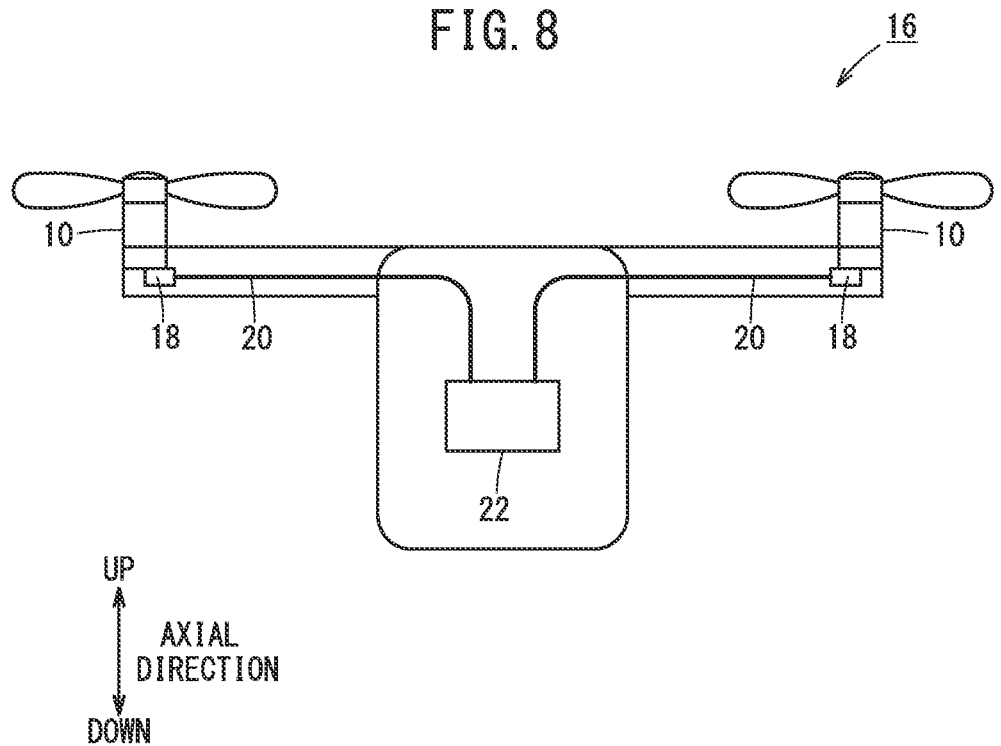
FIG. 8 is a schematic diagram of an apparatus on which the rotating electric machine is mounted.

As shown in FIG. 1, a rotating electric machine 10 according to the present embodiment has a cylindrical motor case 12, and a rotating shaft portion 14 protrudes from one end of the motor case 12 in an axial direction. The rotating electric machine 10 is mounted as a main power source on an apparatus 16 such as an electric aircraft, an electric vehicle, and various general-purpose devices as shown in FIG. 8, for example. Maintenance is performed on the apparatus 16 after the rotating electric machine 10 has been used for a certain period of time or when the rotating electric machine 10 fails to rotate properly. This maintenance is, for example, replacement of the rotating electric machine 10, and involves removal work of the rotating electric machine 10. The rotating electric machine 10 of the present embodiment facilitates the removal work from the apparatus 16.

Hereinafter, a specific configuration of the rotating electric machine 10 will be described. In the following description, terms such as "up", "down", "width direction", "front surface", and "rear surface" are used, but these terms are used to explain the position and connection relation of the constituent members of the rotating electric machine 10, and are not descriptions limiting the arrangement direction of the rotating electric machine 10.

Figure 2:
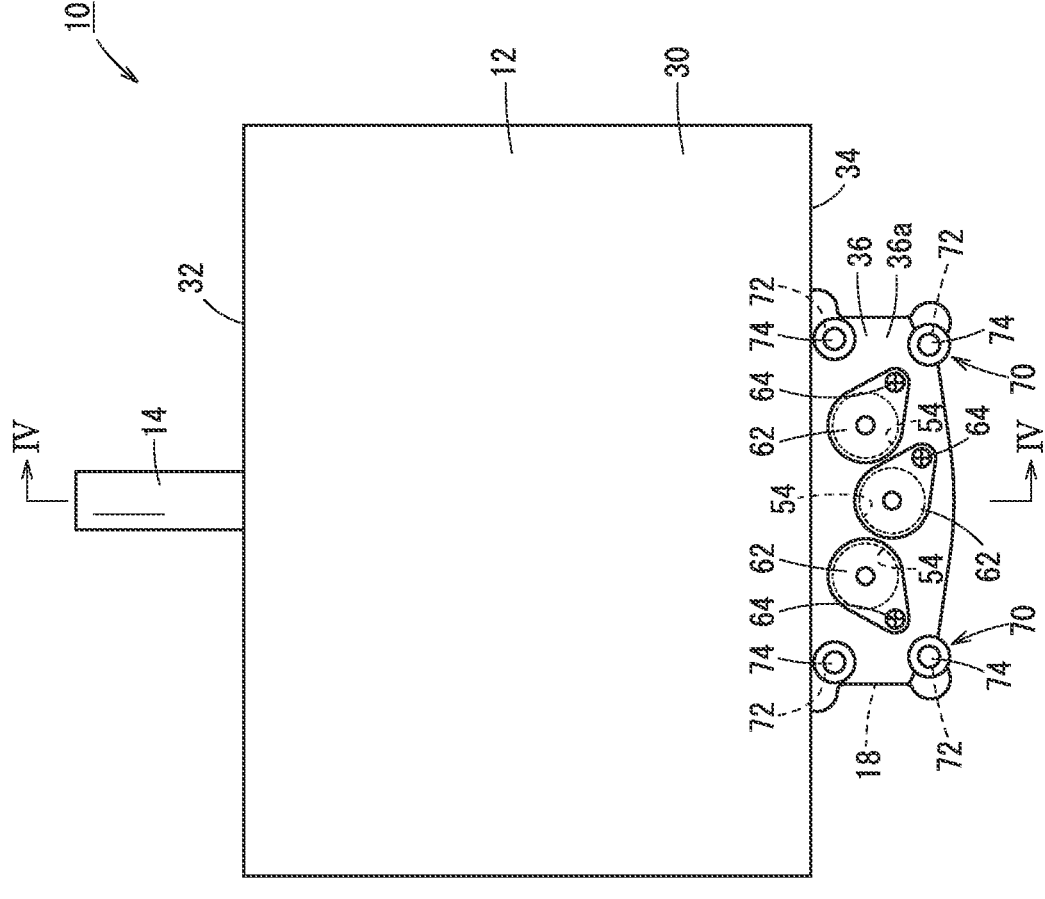
FIG. 2 is a rear view of the rotating electric machine shown in FIG. 1.
Figure 2:
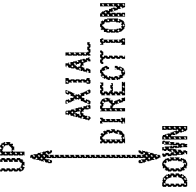
Figure 3:
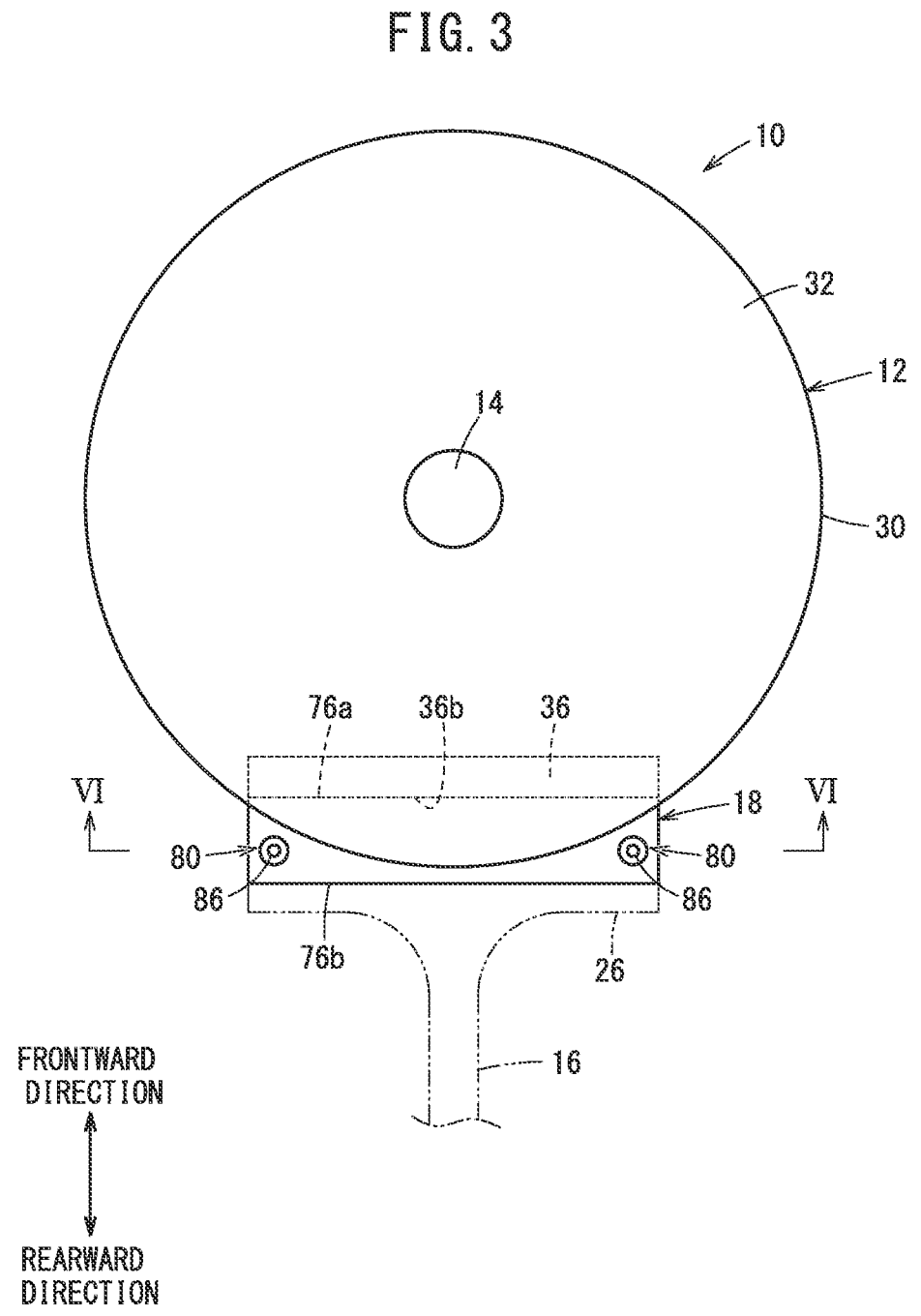

As shown in FIGS. 1 to 3, the motor case 12, the rotating shaft portion 14, and a terminal box 18 appear in the external appearance of the rotating electric machine 10. As shown in FIG. 1, the rotating electric machine 10 is used in a state in which a power supply cable 20 is connected to the terminal box 18. The power supply cable 20 is a member of the apparatus 16 shown in FIG. 8, and supplies power from a power supply 22 to the rotating electric machine 10. The power supply cable 20 is, for example, a three-phase cable, and has three wires 24 as shown in FIG. 1. The power supply cable 20 has a connector 26 and a wiring terminal 28 (see FIG. 4) at an end thereof. As shown in FIG. 4, the wiring terminals 28 are respectively attached to the end portions of the three wires 24.

As shown in FIGS. 1 to 3, the motor case 12 has a cylindrical circumferential wall portion 30, a first wall 32 covering one end of the circumferential wall portion 30, and a second wall 34 covering another end of the circumferential wall portion 30. The first wall 32 and the second wall 34 have planes perpendicular to a central axis of the circumferential wall portion 30. The first wall 32 is located on a side (upper side) where the rotating shaft portion 14 protrudes. The second wall 34 is located on an opposite side (lower side) to the side where the rotating shaft portion 14 protrudes. As shown in FIGS. 2 and 4, an extending portion 36 and the terminal box 18 protrude from the second wall 34.

As shown in FIG. 4, the rotating electric machine 10 includes a rotor 38, a stator 40, and lead wires 42 inside the motor case 12. Further, the rotating electric machine 10 has a connection terminal 44 inside the terminal box 18. The rotor 38 is positioned relatively near the center of the motor case 12 and is supported by the rotating shaft portion 14. The rotor 38 applies rotational torque to the rotating shaft portion 14, and rotates integrally with the rotating shaft portion 14. The stator 40 is located on an outer circumferential side of the rotor 38 and surrounds the rotor 38. The stator 40 exerts a magnetic force on the rotor 38. One or both of the rotor 38 and the stator 40 include coils 46 for generating a magnetic field for driving. In the illustrated example, the rotor 38 includes permanent magnets 48, and the stator 40 includes the coils 46.

Each of the lead wires 42 is a current supply path for each of the coils 46 and is connected to an end portion of each of the coils 46. The lead wires 42 are provided according to the number of phases of the rotating electric machine 10. When the rotating electric machine 10 has two phases, for example, two lead wires 42 are provided, and when it has three phases, three lead wires 42 are provided. In the illustrated example, the rotating electric machine 10 has three phases, and the rotating electric machine 10 includes three lead wires 42. The three lead wires 42 are arranged in a row in a direction perpendicular to the paper sheet of FIG. 4.

As shown in FIG. 4, the lead wires 42 extend in the axial direction of the motor case 12, and tips thereof protrude from a bottom surface 50 of the second wall 34. A distal end portion 42a of each of the lead wires 42 is connected to the connection terminal 44 through a first fixing portion 58 described later.

The motor case 12 has the extending portion 36 surrounding the three lead wires 42. The extending portion 36 protrudes from the bottom surface 50 of the second wall 34 in the axial direction. As shown in FIG. 3, when viewed in the axial direction, the extending portion 36 extends long in an arrangement direction (width direction) of the three lead wires 42. As shown in FIG. 4, the extending portion 36 has a cavity 52 that accommodates the lead wires 42 therein. The extending portion 36 protects the lead wires 42 by surrounding the entire periphery of the lead wires 42 while being separated laterally from the lead wires 42.

The extending portion 36 further includes openings 54 and terminal insertion holes 56. Each of the openings 54 is formed on a rear surface 36a of the extending portion 36. The openings 54 are formed at positions where the first fixing portions 58 for fixing the lead wires 42 and the connection terminal 44 can be exposed to the outside. Each of the openings 54 has a dimension that allows the lead wire 42 and the connection terminal 44 to be fixed or released by the first fixing portion 58. For example, when the first fixing portion 58 is a fixing structure using bolts 58c, each of the openings 54 has a diameter through which each of the bolts 58c and a fastening tool thereof can be inserted.

As shown in FIG. 2, three openings 54 are provided, the number of which is equal to that of the lead wires 42. As shown in FIG. 4, the extending portion 36 has lids 62 for closing the openings 54. The lids 62 are fixed to the extending portion 36 by set screws 64 (see FIG. 2). The lids 62 prevent dust and water from entering the openings 54. When the set screws 64 are removed, the lids 62 can be removed from the openings 54.

Figure 6:
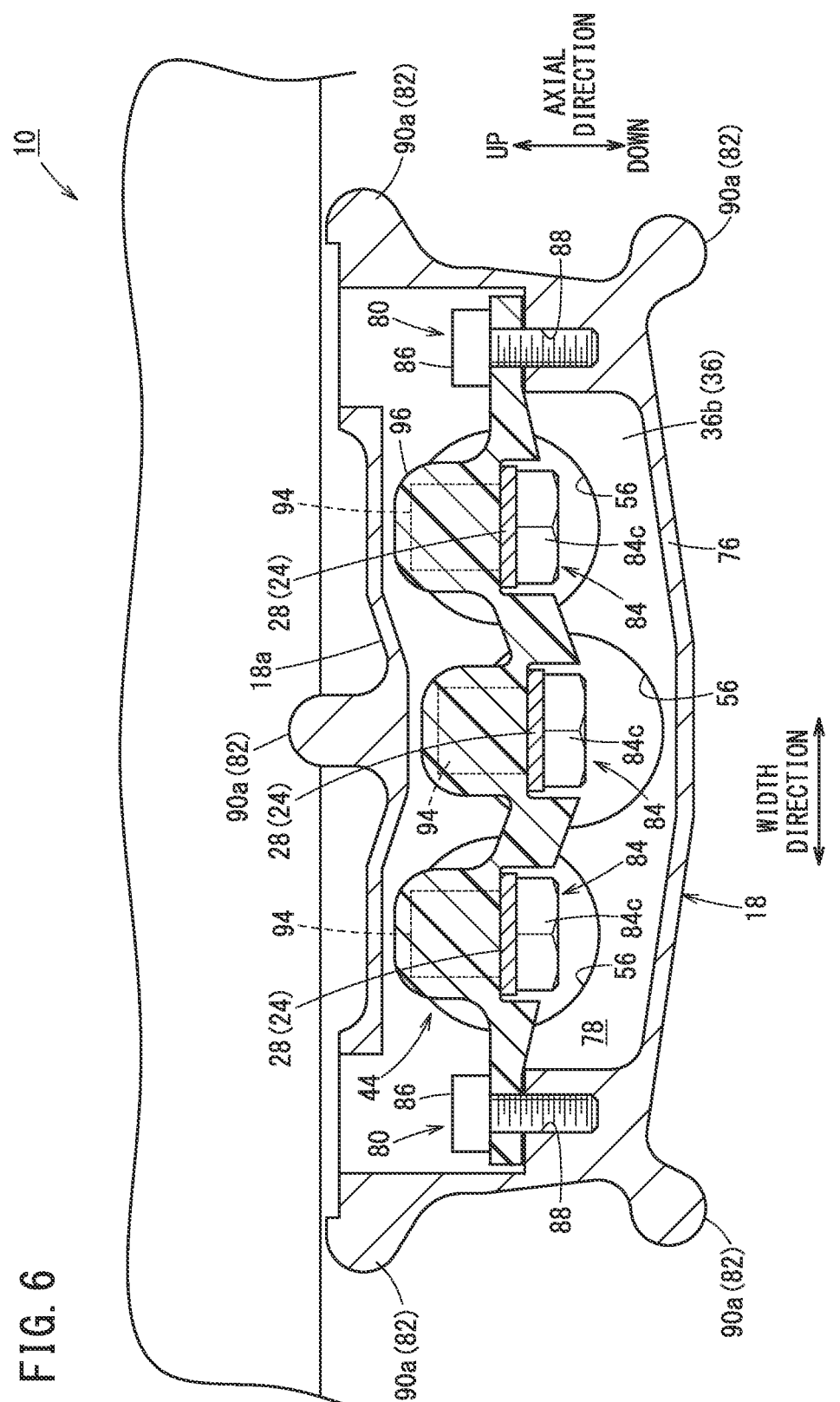
FIG. 6 is a cross-sectional view taken along line VI-VI of FIG. 3 (and FIG. 4)

The terminal insertion holes 56 are formed on a front surface 36b side of the extending portion 36. The connection terminal 44 is inserted into the terminal insertion holes 56. The connection terminal 44 is partially accommodated in the extending portion 36 through the terminal insertion hole 56. As shown in FIG. 6, each of the terminal insertion holes 56 is formed in a circular shape when viewed from the front.

The terminal insertion holes 56 are provided in the same number (for example, three) as the number of the lead wires 42. The terminal insertion holes 56 are arranged side by side in the width direction of the extending portion 36. The terminal insertion hole 56 at the center is further apart from the bottom surface 50 of the motor case 12 than the terminal insertion holes 56 at both ends, thereby forming a gap between the terminal insertion hole 56 and the bottom surface 50.

As shown in FIG. 2, the extending portion 36 has a box fixing structure 70 for fixing the terminal box 18 (see FIG. 4). The box fixing structure 70 has a plurality of boss holes 72 provided in the terminal box 18 and box fixing screws 74 inserted into the boss holes 72. Each of the box fixing screws 74 is inserted from the extending portion 36 into the boss hole 72, and is screwed into the boss hole 72 of the terminal box 18 (see FIG. 4) to fix the terminal box 18 and the extending portion 36.

Figure 7A:
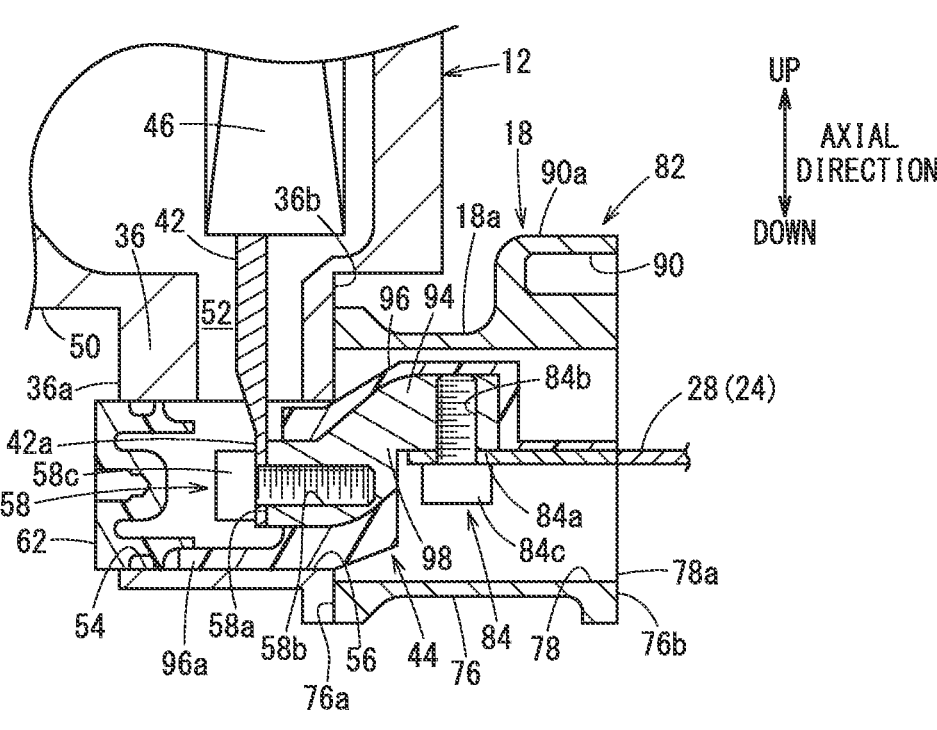
FIG. 7A is an enlarged cross-sectional view of a connection terminal, a terminal box, a lead wire and the extended portion in FIG. 4.

As shown in FIGS. 4 and 6, the terminal box 18 includes a box body 76, a terminal accommodating chamber 78, terminal fixing portions 80, and connector fixing portions 82. The box body 76 is a tubular member, and as shown in FIG. 3, is formed in a substantially rectangular shape in a top view. As shown in FIG. 7A, the box body 76 is connected to a side portion of the extending portion 36 on the front surface 36b side. A part of the central portion of the box body 76 overlaps with a range (projection range) where the motor case 12 is projected in the axial direction of the motor case 12. Both side portions of the box body 76 protrude outside the projection range in the axial direction of the motor case 12.

The terminal accommodating chamber 78 accommodates the front side of the connection terminal 44 partially, and second fixing portions 84. The connection terminal 44 is formed inside the box body 76 and penetrates through a rear surface 76a and a front surface 76b of the box body 76. A rear surface side of the terminal accommodating chamber 78 is closed by the extending portion 36. The terminal accommodating chamber 78 opens in the front surface 76b of the box body 76 to form a cable insertion port 78a. The cable insertion port 78a receives the wires 24 extending from the power supply cable 20 and the wiring terminals 28 thereof.

As shown in FIG. 6, the terminal fixing portions 80 are located in both sides of the box body 76 in the width direction. Each of the terminal fixing portions 80 has a terminal fixing screw 86 and a boss hole 88. The terminal fixing screw 86 extends in the axial direction and penetrates side portions of the connection terminal 44. The terminal fixing screw 86 is screwed into the boss hole 88 to fix the connection terminal 44 to the terminal box 18. As shown in FIG. 3, the terminal fixing portions 80 are positioned outside the projection range in the axial direction of the motor case 12. Therefore, in the rotating electric machine 10, the connection terminal 44 can be removed together with the power supply cable 20 without removing the terminal box 18 from the motor case 12.

As shown in FIG. 4, the connector fixing portions 82 have boss holes 90 formed on the front surface side of the terminal box 18. As shown in FIG. 7A, each of the boss holes 90 is formed in a bulging portion 90a which bulges outward from a peripheral edge portion of the terminal box 18. As shown in FIG. 1, the plurality of boss holes 90 (five in the illustrated example) are formed around the box body 76, and a connector fixing screw 92 is inserted into each of the boss holes 90. The connector 26 attached to the power supply cable 20 is fixed to the front surface of the terminal box 18 by the connector fixing screws 92 and the boss holes 90.

Figure 7B:
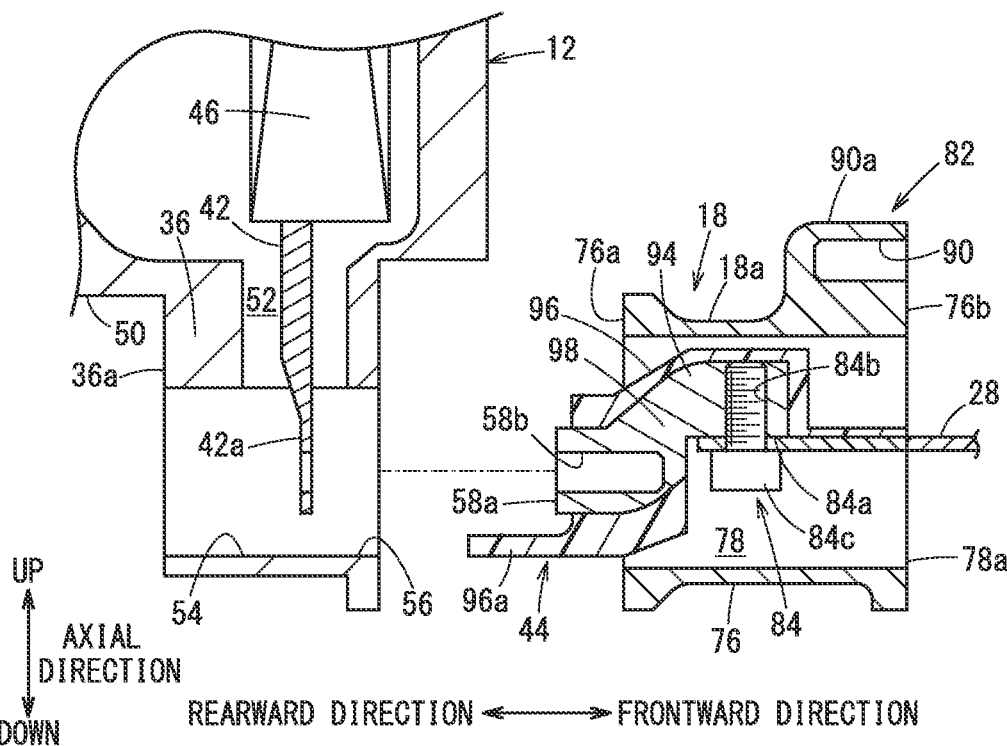
FIG. 7B is a cross-sectional view showing a state in which the terminal box and the extended portion in FIG. 7A are separated from each other.

As shown in FIGS. 6, 7A and 7B, the connection terminal 44 includes a plurality of conductor portions 94 and an insulating member 96. Each of the conductor portions 94 is formed of a metal having a high conductivity such as copper or aluminum. The connection terminal 44 has three conductor portions 94, the number of which is the same as the number of the lead wires 42. Each of the conductor portions 94 is covered with the insulating member 96 and insulated from each other. One end of the conductor portion 94 is accommodated in the extending portion 36, and another end thereof is accommodated in the terminal accommodating chamber 78 (terminal box 18). The conductor portion 94 has the first fixing portion 58 at one end and the second fixing portion 84 at the other end thereof. The first fixing portion 58 fixes the conductor portion 94 and the lead wire 42, and the second fixing portion 84 fixes the conductor portion 94 and the wiring terminal 28 of the power supply cable 20.

Each of the first fixing portions 58 includes, for example, a first connecting surface 58a, a bolt hole 58b, and the bolt 58c. The first connecting surface 58a is an end surface of the conductor portion 94 and is a surface that is parallel to the axial direction. The first connecting surface 58a is in surface contact with the lead wire 42. The bolt hole 58b extends in a direction perpendicular to the first connecting surface 58a. The bolt hole 58b has a screw groove in its inner circumferential portion. The bolt 58c is screwed into the bolt hole 58b to fix the lead wire 42 to the first connecting surface 58a.

Each of the second fixing portions 84 may be composed of, for example, a second connecting surface 84a, a bolt hole 84b, and a bolt 84c. The second connecting surface 84a is a bottom surface of the conductor portion 94 and is a surface perpendicular to the first connecting surface 58a. The second connecting surface 84a is in surface contact with the wiring terminal 28 of the power supply cable 20. The bolt hole 84b of the second fixing portion 84 extends in a direction perpendicular to the second connecting surface 84a. The bolt hole 84b has a screw groove on its inner surface. The bolt 84c of the second fixing portion 84 is screwed into the bolt hole 84b to fix the wiring terminal 28 to the bottom surface of the conductor portion 94.

It should be noted that the first fixing portion 58 and the second fixing portion 84 are not limited to the fixing with bolts, but various fixing methods such as fitting, pressure bonding, or soldering may be adopted.

The conductor portion 94 has a bent portion 98. The bent portion 98 is bent such that the position of the second fixing portion 84 is closer to the second wall 34 of the motor case 12 than the position of the first fixing portion 58 is. The bent portion 98 allows the second fixing portion 84 of the conductor portion 94 to be located close to the motor case 12. The bent portion 98 suppresses downward protrusion of the conductor portion 94, and enables a reduction in size of the terminal box 18.

As shown in FIG. 6, the three conductor portions 94 are arranged side by side in the width direction. Of the three conductor portions 94, the central conductor portion 94 is disposed farther from the bottom surface 50 of the second wall 34 than the other conductor portions 94 are. Therefore, a central portion of the connection terminal 44 in the width direction is positioned lower than the other adjacent portions of the connection terminal 44. An upper end wall 18a of the terminal box 18 is recessed at the center in the width direction. The bulging portion 90a (boss) is formed on the upper end wall 18a of the recessed portion.

As shown in FIGS. 7A and 7B, the insulating member 96 covers the periphery of the conductor portions 94 to electrically insulate the conductor portions 94 from the surrounding members. The insulating member 96 exposes the conductor portions 94 at the first fixing portions 58 and the second fixing portions 84. As shown in FIG. 6, the insulating member 96 extends in the width direction and mechanically connects the plurality of conductor portions 94. End portions of the insulating member 96 in the width direction extend to the terminal fixing portions 80 of the terminal box 18. The insulating member 96 is fixed to the terminal box 18 by screws at the terminal fixing portions 80.

As shown in FIG. 7A, the insulating member 96 has a lower edge portion 96a extending from an end portion on a first fixing portion 58 side thereof to the rear surface side. The lower edge portion 96a extends to the rear surface side beyond the contact surface between the lead wire 42 and the conductor portion 94 (end surface of the conductor portion 94). The lower edge portion 96a covers the connecting portion of the lead wire 42 and the conductor portion 94, and the lower portion of the bolt 58c, like a wall. The lower edge portion 96a increases the creepage distance between the extending portion 36 and the first fixing portion 58 in the vicinity of the first fixing portion 58, thereby increasing the insulation property for the first fixing portion 58.

The rotating electric machine 10 of the present embodiment is configured as described above. The method of removing the rotating electric machine 10 while the power supply cable 20 and the connection terminal 44 are connected is performed as follows.

Figure 5:
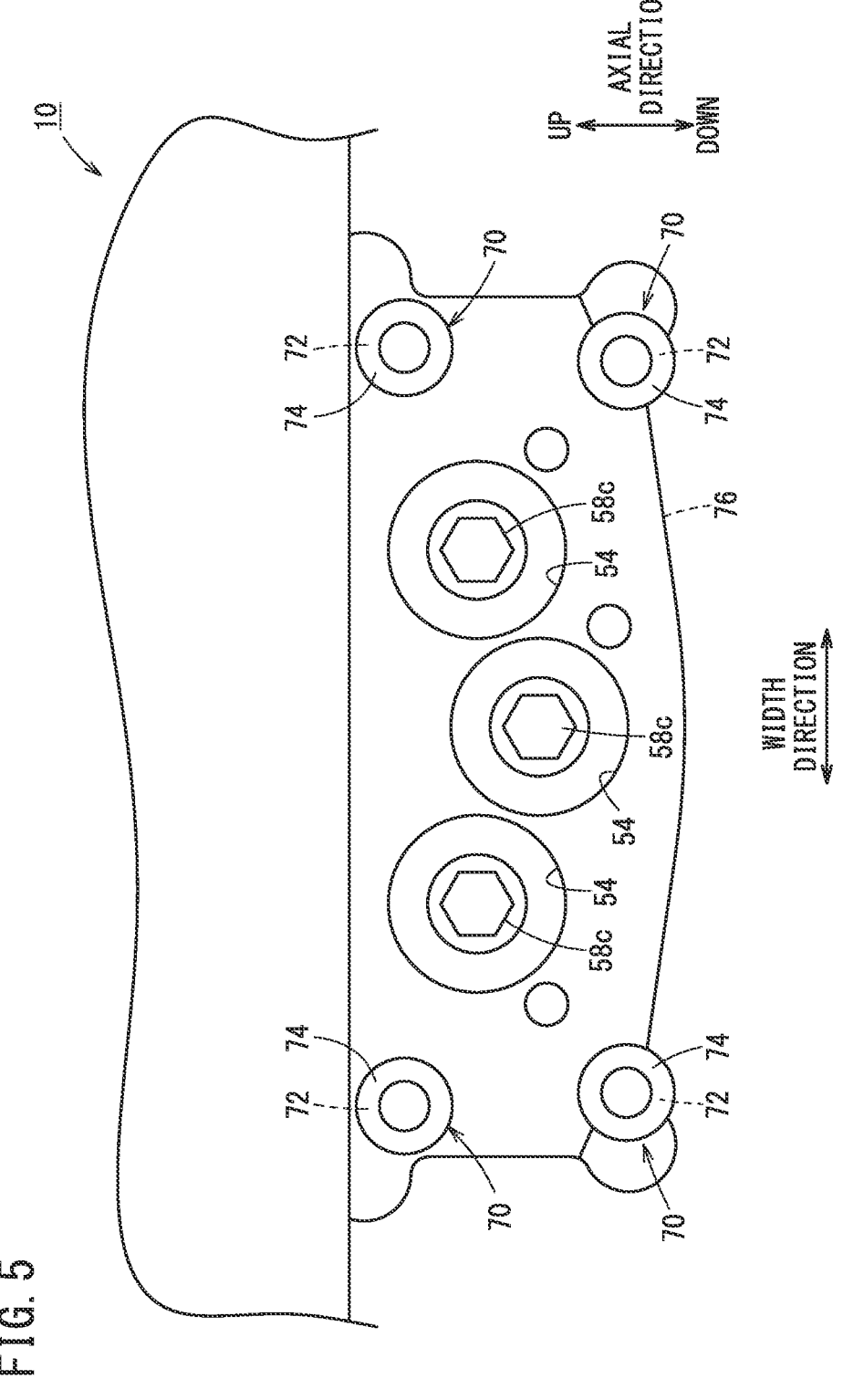
FIG. 5 is a partially enlarged view showing a state in which a lid of an extended portion in FIG. 1 is removed.

First, an operation for removing the lids 62 of the openings 54 shown in FIG. 2 is performed. Prior to removal of the lids 62, the set screws 64 for fixing the lids 62 to the extending portion 36 are removed. Thereafter, the lids 62 are removed, and as shown in FIG. 5, the bolts 58c of the first fixing portions 58 are exposed to the openings 54. Next, the bolts 58c are removed through the openings 54. When the three bolts 58c are removed, the fixing between the connection terminal 44 and the three lead wires 42 is released.

Next, the plurality of box fixing screws 74 located at the peripheral edge portions of the extending portion 36 in FIG. 5 are removed. When the five box fixing screws 74 are removed, the fixing between the terminal box 18 and the extending portion 36 is released, and the terminal box 18 can be removed from the motor case 12.

Thereafter, the connection terminal 44 is pulled out from the terminal insertion holes 56 of the extending portion 36. The connection terminal 44 is pulled out by moving the terminal box 18 to the front surface side. The connection terminal 44 is separated from the motor case 12 in a state of being connected to the power supply cable 20 through the second fixing portions 84. Thereafter, the rotating electric machine 10 is detached from the power supply cable 20. The attachment of the rotating electric machine 10 is performed by performing the above-described steps in reverse order.

As shown in FIG. 8, for example, the rotating electric machine 10 according to the present embodiment is suitable for maintenance work of the apparatus 16 in which the rotating shaft portion 14 of the rotating electric machine 10 is mounted so as to project upward. That is, in the apparatus 16, since the power supply cable 20 and the connection terminal 44 can be detached from the motor case 12 by operation from below the rotating electric machine 10, workability is excellent.

Modification 1 of Present Embodiment

The rotating electric machine 10 of the present embodiment is not limited to the above-described aspect, and various aspects can be taken. For example, in the rotating electric machine 10, the location where the lead wires 42 protrude is not limited to the second wall 34, and may be positioned in the circumferential wall portion 30 or the first wall 32. In this case, the extending portion 36 and the terminal box 18 are provided on the circumferential wall portion 30 or the first wall 32.

Modification 2 of Present Embodiment

In the rotating electric machine 10 of the present embodiment, the entire of the lead wires 42 may be accommodated inside the first wall 32, the second wall 34 and the circumferential wall portion 30 of the motor case 12. In this case, the connection terminal 44 protrudes from the first wall 32, the second wall 34 or the circumferential wall portion 30. The first fixing portions 58 fix the lead wires 42 and the connection terminal 44 inside the first wall 32, the second wall 34 and the circumferential wall portion 30. The terminal box 18 is detachably connected to the first wall 32, the second wall 34 or the circumferential wall portion 30. Further, the openings 54 of the motor case 12 are formed at any of the first wall 32, the second wall 34 or the circumferential wall portion 30, and at positions where the first fixing portions 58 can be exposed. In this case, the rotating electric machine 10 may have the lids 62 for closing the openings 54, or the terminal box 18 may also serve as the lids 62 for the openings 54.

With respect to the above disclosure, the following appendices are disclosed.

(1) One aspect of the disclosure is a rotating electric machine 10 including the motor case 12 configured to accommodate the rotor 38 and the stator 40, the lead wire 42 accommodated in the motor case and configured to supply current to the coil 46 that is configured to generate a magnetic field for driving, the connection terminal 44 including the first fixing portion 58 at one end and a second fixing portion 84 at the other end, the first fixing portion being fixed to the lead wire and the second fixing portion being fixed to the power supply cable 20, and the terminal box 18 configured to accommodate the second fixing portion of the connection terminal, wherein the terminal box is configured to be separated from the motor case, the motor case includes the opening 54 from which the first fixing portion is exposed to outside, and the connection terminal is configured to be separated from the motor case together with the terminal box when fixing between the lead wire and the first fixing portion is released.

In the rotating electric machine described above, the connection between the lead wire and the connection terminal is released while maintaining the connection between the connection terminal and the power supply cable, and the connection terminal can be separated from the motor case together with the terminal box. Therefore, in the above rotating electric machine, only the rotating electric machine can be removed while the connection terminal and the terminal box are left on the side of the apparatus to which the rotating electric machine is mounted, at the time of maintenance. Therefore, the maintainability of the rotating electric machine is improved.

(2) In the rotating electric machine according to the appendix (1) above, when the axial direction of the motor case is the vertical direction, the connection terminal and the terminal box may be positioned on the bottom surface 50 of the motor case. In this rotating electric machine, when the rotating shaft portion is disposed in the vertical direction and mounted on the apparatus, the operation of removing the rotating electric machine can be performed from below the rotating electric machine, and workability is excellent.

(3) In the rotating electric machine according to the appendix (1) or (2) above, the terminal box may be disposed in a manner so that at least a part of the terminal box overlaps with the projection range where the motor case is projected in the axial direction. This rotating electric machine can suppress lateral protrusion of the terminal box, and can suppress enlargement of the rotating electric machine in the radial direction.

(4) In the rotating electric machine according to any one of the appendices (1) to (3) above, the lead wire protrudes downward from the bottom surface, and the motor case may include the extending portion 36 that surrounds the lead wire protruding downward from the bottom surface. This rotating electric machine can protect the lead wire when it is attached to or detached from the apparatus on which the rotating electric machine is mounted.

(5) In the rotating electric machine according to any one of the appendices (1) to (4) above, the terminal box may be connected to a side surface of the extending portion of the motor case. This rotating electric machine can protect the connection terminal by forming an enclosure around the connection terminal while making the connection direction of the power supply cable different from the extending direction of the lead wire.

(6) In the rotating electric machine according to any one of the appendices (1) to (5) above, the connection terminal may include the bent portion 98 bent in a manner so that the position of the second fixing portion is closer to the motor case than the position of the first fixing portion is. In this rotating electric machine, since the fixing portion of the cable and the connection terminal can be made close to the second wall (motor case) than the fixing portion of the lead wire and the connection terminal is, the protrusion of the connection terminal from the bottom surface can be suppressed.

(7) The rotating electric machine according to any one of the appendices (1) to (6) above, the power supply cable may be a three-phase cable, the connection terminal may include three conductor portions 94 in the terminal box, the second fixing portions of the three conductor portions may be arranged side by side in the width direction in the terminal box, and the second fixing portions adjacent to each other may have different heights in the vertical direction. In this rotating electric machine, an empty space can be secured in the terminal box by making the heights of the second fixing portions different, and the degree of freedom in the layout of various fixed structures can be increased.

(8) The rotating electric machine according to any one of the appendices (1) to (7) above, among the three conductor portions, the conductor portion positioned at a center in the width direction may be further apart from the bottom surface of the motor case than other conductor portions are, and the terminal box may include the upper end wall 18a that is recessed at the center in the width direction and the boss on the upper end wall at the center in the width direction. In this rotating electric machine, by providing the boss in an empty space of the terminal box, the protruding portion at the upper part of the terminal box can be reduced in size.

(9) In the rotating electric machine according to any one of the appendices (1) to (8) above, the connection terminal may include the conductor portion 94 and the insulating member 96 covering the conductor portion, and the insulating member may include the lower edge portion 96a extending beyond the contact surface between the lead wire and the conductor portion, so as to cover the lower portion of the lead wire. In this rotating electric machine, since the lower edge portion is extended so as to exceed the contact surface between the conductor portion and the lead wire on the lead wire side of the connection terminal, insulation performance between the second fixing portion and both the extending portion and the terminal box can be ensured.

Moreover, it should be noted that the present invention is not limited to the disclosure described above, and various configurations may be adopted therein without departing from the essence and gist of the present invention.

The invention claimed is:

1. A rotating electric machine comprising:
a motor case configured to accommodate a rotor and a stator;
a lead wire, said lead wire:
 connected to an end portion of a coil that is configured to generate a magnetic field for driving and is accommodated in the motor case;
 protruding from a bottom surface of the motor case, and configured to supply current to the coil;
a connection terminal including a first fixing portion at one end and a second fixing portion at another end, the first fixing portion being fastened and fixed to the lead wire and the second fixing portion being fixed to a power supply cable; and
a terminal box configured to accommodate the second fixing portion of the connection terminal,
wherein the terminal box is configured to be separated from the motor case,
the motor case includes:
 an extending portion that protrudes downward from the bottom surface and surrounds the lead wire,
 an opening that is formed on the extending portion and from which the first fixing portion is exposed to outside, and
 a lid that closes the opening,
the first fixing portion releases fixing between the connection terminal and the lead wire through the opening, and
the connection terminal is configured to be separated from the motor case together with the terminal box when fixing between the lead wire and the first fixing portion is released.

2. The rotating electric machine according to claim 1, wherein when an axial direction of the motor case is a vertical direction, the connection terminal and the terminal box are positioned on a bottom surface of the motor case.

3. The rotating electric machine according to claim 2, wherein the terminal box is disposed in a manner so that at least a part of the terminal box overlaps with a projection range where the motor case is projected in the axial direction.

4. The rotating electric machine according to claim 1, wherein the terminal box is connected to a side surface of the extending portion of the motor case.

5. The rotating electric machine according to claim 4, wherein the connection terminal includes a bent portion bent in a manner so that a position of the second fixing portion is closer to the motor case than a position of the first fixing portion is.

6. The rotating electric machine according to claim 5, wherein the power supply cable is a three-phase cable, the connection terminal includes three conductor portions in the terminal box, the second fixing portions of the three conductor portions are arranged side by side in a width direction in the terminal box, and the second fixing portions adjacent to each other have different heights in a vertical direction.

7. The rotating electric machine according to claim 6, wherein among the three conductor portions, the conductor portion positioned at a center in the width direction is further apart from the bottom surface of the motor case than other conductor portions are, and the terminal box includes an upper end wall that is recessed at the center in the width direction and a boss on the upper end wall at the center in the width direction.

8. The rotating electric machine according to claim 5, wherein the connection terminal includes a conductor portion and an insulating member covering the conductor portion, and
the insulating member includes a lower edge portion extending beyond a contact surface between the lead wire and the conductor portion, so as to cover a lower portion of the lead wire.

* * * * *